United States Patent [19]
Ohtsuka

[11] Patent Number: 5,610,755
[45] Date of Patent: Mar. 11, 1997

[54] LENS CHANGEABLE IMAGE SCANNER AND LENS POSITION CONTROL DEVICE IN THE SAME

[75] Inventor: Tadao Ohtsuka, Tokyo, Japan

[73] Assignee: Nippon Steel Corporation, Tokyo, Japan

[21] Appl. No.: 595,284

[22] Filed: Feb. 1, 1996

Related U.S. Application Data

[62] Division of Ser. No. 295,912, Sep. 12, 1994, Pat. No. 5,535,040.

[30] Foreign Application Priority Data

Jan. 12, 1993 [JP] Japan ................................. 5-019701
Jan. 12, 1993 [JP] Japan ................................. 5-019702

[51] Int. Cl.⁶ .................................................. G02B 26/08
[52] U.S. Cl. ........................................... 359/210; 355/61
[58] Field of Search ................................ 359/210, 813, 359/814; 250/234, 201.2; 355/55–61; 358/474, 482–483, 494, 296, 302; 353/101

[56] References Cited

U.S. PATENT DOCUMENTS 3,741,647  6/1973  Harris .
4,050,780  9/1977  Wei et al. .
4,266,855  5/1981  Mohn .
4,870,453  9/1989  Shimizu et al. ............................ 355/59

FOREIGN PATENT DOCUMENTS 54-71921   6/1979  Japan .
58-147275  9/1983  Japan .

Primary Examiner—James Phan
Attorney, Agent, or Firm—Pollock, Vande Sande & Priddy

[57] ABSTRACT

A lens position control mechanism and method in an image scanner converts a reading line density by changing over lenses. A base rotatable in a plane parallel to an original table is provided, and the lenses are supported on the base so that their optical axes are in a plane parallel to the base surface and intersect each other at a pivot. A proper kind of lens can be arranged at a proper position by controlling the rotation of the base in such a manner that a reference pattern is provided at a position at which it is readable by an image receiving element through the lens and a lens existing in an optical path is judged on the basis of a received image of the reference pattern to confirm the position of the lens. Thereby, an image scanner capable of changing over lenses at a high precision can be obtained without increasing the height of the image scanner.

4 Claims, 5 Drawing Sheets

LENS CHANGEABLE IMAGE SCANNER AND LENS POSITION CONTROL DEVICE IN THE SAME

This application is a divisional of U.S. patent application Ser. No. 08/295,912, filed Sep. 12, 1994, now U.S. Pat. No. 5,535,040.

TECHNICAL FIELD

The present invention relates to an image scanner, and more particularly to an image scanner in which a reading line density or the like can be converted by changing over lenses and to a lens position control structure and method in such an image scanner.

BACKGROUND ART

A resolving power required in an image scanner is regarded as being different in accordance with an original, for example, 400 dpi (dots per inch) for reading an A3-size sketch or the like, 600 dpi for reading an A4-size document having a high frequency of use as a simple print original, and 1200 dpi for reading a transparent original up to 4×5 inches.

In the conventional method responding to such requirements, a plurality of kinds of lenses having different magnifying factors are selectively used in order to change a line density in an image scanner. A general structure of a lens change-over structure in such an image scanner includes, for example, a structure in which each lens is mounted on a slider capable of moving on a rail so that it is selectively positioned in front of an image receiving element such as a CCD (or charge-coupled device) by motor-driving the slider or a structure in which each lens is held on a rotatable disk-like holder so that it is selectively positioned in front of an image receiving element by motor-driving the holder. In such a structure, the positioning of the lens for the image receiving element is made using a limit switch or a proximity sensor.

However, the lens as mentioned above requires a high precision for its optical position relationship. Therefore, for example, in the case of the type in which the slider holding each lens thereon is linearly moved on the rail, a certain degree of precision for the installation of the rail is required over the whole of a moving range of the slider and hence the rail assembling work is liable to become troublesome. Also, in the image scanner as mentioned above, it is general that a scanning unit scans along a horizontal original table mounted with an original sheet and an image received by a mirror is reflected parallel to the original table and is then received by the image receiving element. Accordingly, it is desired in view of operability that the size of the image scanner in a direction of height thereof or a direction perpendicular to the original table should be made as small as possible. However, in the case of the type in which the disk-like holder holding each lens thereon is rotated, the disk-like holder is rotated in a plane perpendicular to an optical path and hence the holder projects in the above-mentioned height direction, which provides a problem that the whole of the image scanner becomes large in size and the operability thereof is deteriorated.

Further, a positional relationship between the actual lens and the image receiving element differs for every lens due to problems inclusive of the precision of assembly. Therefore, in order to accurately make the optical positioning of the lens and the image receiving element by use of the limit switch or the proximity sensor as mentioned above, the position of each sensor itself must be adjusted for every image scanner. This work is liable to be troublesome.

A principal object of the present invention made in light of the above-mentioned problems of the prior art is to provide an image scanner in which the high-precision positioning of a plurality of lenses upon change-over is possible with a simple structure and the size of the whole of a device is not increased.

Another principal object of the present invention is to provide a lens position control structure and control method in an image scanner in which the kinds and/or positions of a plurality of lenses can be accurately detected and controlled with a simple structure.

DISCLOSURE OF INVENTION

According to the present invention, the above first object is achieved by providing an image scanner comprising a table on which an object is arranged to take in an image of the object by an image receiving element, scanning means for relatively scanning a surface of the table, a reflecting optical system for directing an image from the scanning means toward the image receiving element so that it is parallel to the table, and a plurality of kinds of lenses capable of being used in a change-over manner, wherein there is provided a base which has a pivot and is rotatable in a plane parallel to the table surface, and the lenses are supported on the base so that the optical axes of the lenses are positioned on the same plane and intersect each other at the position of the pivot, whereby one of the lenses to be used can be selected by rotating the base.

With such a construction, since each lens is thus supported on the rotatable base with the pivot, the precision of the positioning of each lens can be ensured if only the precision of the pivot is ensured. Also, since the direction of rotation of the base is parallel to the surface of the original table, the size in a height direction is substantially the same as that in the case of a single lens.

According to the present invention, the above second object is achieved by providing a lens position control structure in an image scanner in which a plurality of lenses can be used in a change-over manner to take in the image of an object by an image receiving element, the structure comprising a reference pattern provided at a predetermined position at which it is readable through the lens, and means for detecting the kind of the lens from image data of the reference pattern read by the image receiving element provided in an optical path, and by providing a lens position control method in an image scanner in which a plurality of lenses can be used in a change-over manner to take in the image of an object by an image receiving element, the method comprising a step of reading image data of a reference pattern provided at a predetermined position at which it is readable through the lens, and a step of detecting the kind of the lens from the image data. Particularly, it is preferable that the position of the lens is detected from the image data of the reference pattern read by the image receiving element.

With such a construction, since the kind and/or position of the lens used is detected from the image of the reference pattern which is actually received or obtained, it is possible to accurately and easily perform the lens position control.

BEST MODE FOR CARRYING OUT THE INVENTION

A preferred embodiment of the present invention will now be explained in detail in reference to the accompanying drawings.

Figure 1:
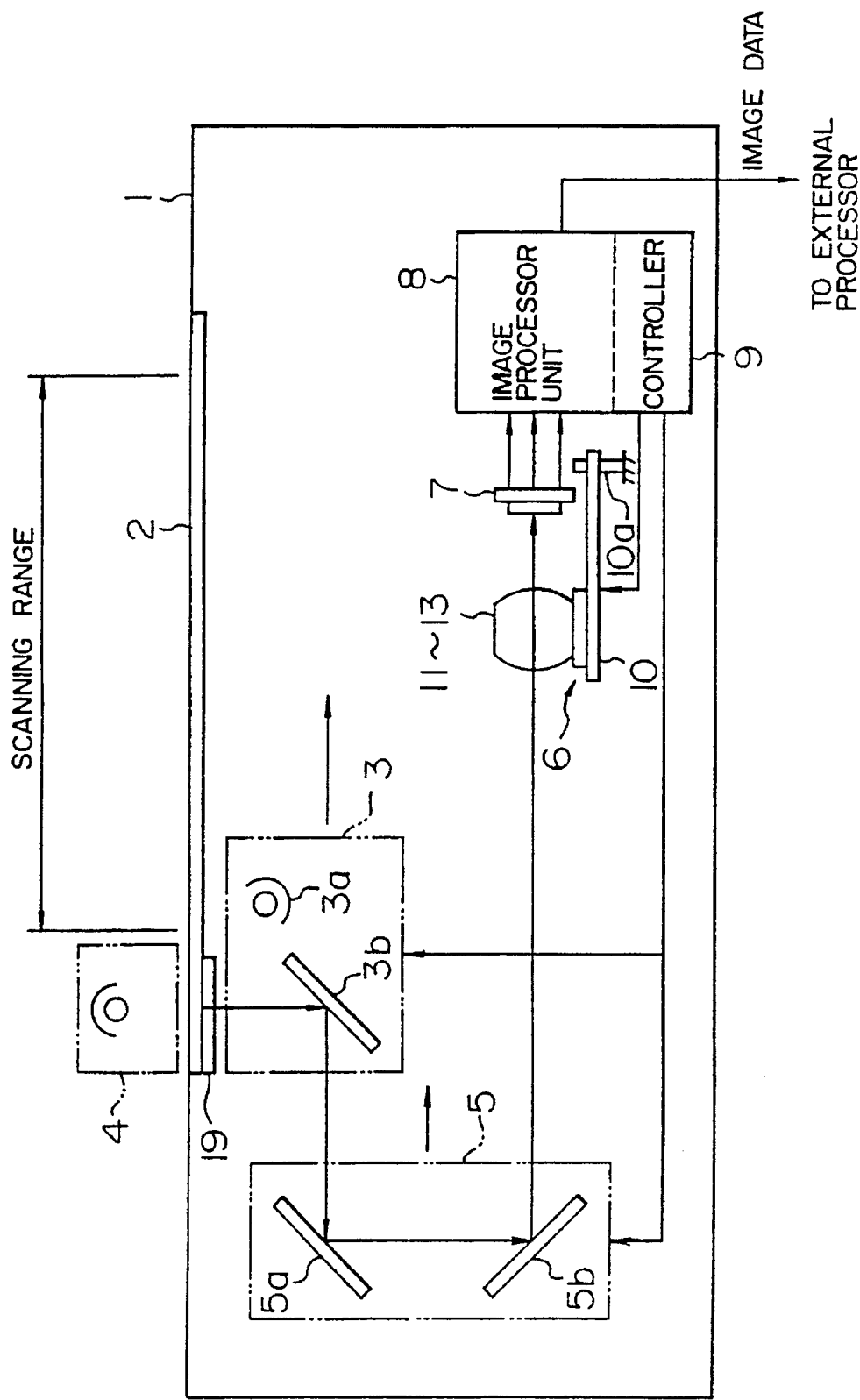
FIG. 1 is a block diagram showing a schematic structure of an image scanner according to an embodiment to which the present invention is applied.
Figure 2:
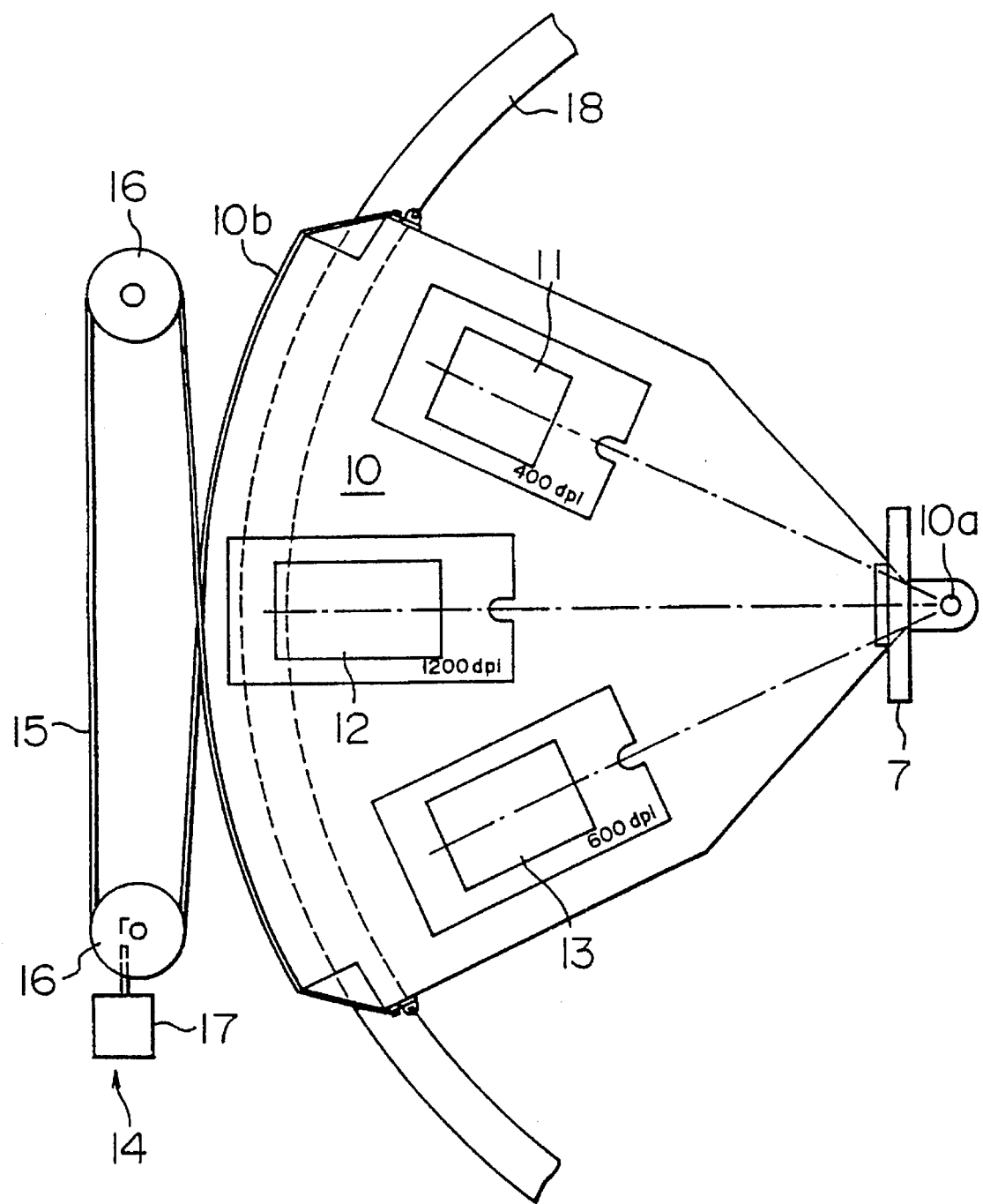
FIG. 2 is a plan view of a lens unit shown in FIG. 1.
Figure 3A:
FIGS. 3(a)–3(h) are front views showing examples of a reference pattern shown in FIG. 1.
Figure 3B:
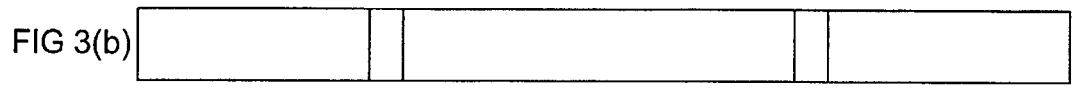
Figure 3C:
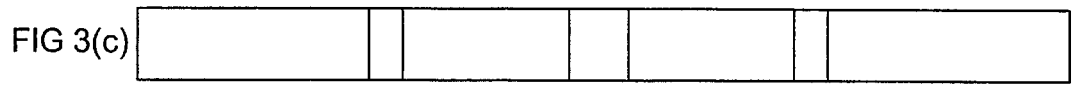
Figure 3D:
Figure 3E:
Figure 3F:
Figure 3G:
Figure 3H:

FIG. 1 is a block diagram showing a schematic structure of an image scanner to which the present invention is applied. An original table 2 is provided at an upper surface portion of a casing 1. A scanning unit 3 including a lamp 3a for reflected illumination and a mirror 3b is provided on the lower surface side of the original table 2, and a lamp 4 for transmitted illumination interlocking with the scanning unit 3 is provided on the upper surface side thereof. Further, at a position opposite to the mirror 3b of the scanning unit 3 is provided a movable mirror unit 5 including a pair of mirrors 5a and 5b for reflecting light from the scanning unit 3 toward an image receiving element 7 so that it is parallel to the original table 2. The scanning unit 3, the lamp 4 for transmitted illumination and the movable mirror unit 5 move and scan parallel to the original table 2. Particularly, the mirror unit 5 moves interlocking with the scanning unit 3 by a distance which is one half of the moving distance of the scanning unit 3. Thereby, a distance between the original table 2 and the image receiving element 7 becomes always the same.

The image receiving element 7 including a CCD for receiving the image of an original placed on the original table 2 from the scanning unit 3 is provided at a position opposite to the mirror 5b of the mirror unit 5 through a lens unit 6 including three lenses with different magnifying factors which can be changed over. Output lines of the image receiving element 7 are connected to an image processor unit 8. An image received by the image receiving element 7 from the original table 2 through the scanning unit 3, the mirror unit 5 and the lens unit 6 is subjected to a processing by the image processor unit 8, which will be mentioned later on, and is then outputted therefrom to the exterior.

The scanning unit 3, the lamp 4 for transmitted illumination, the movable mirror unit 5 and the lens unit 6 are driven and controlled by a controller 9. The controller 9 also controls the processing performed by the image processor unit 8.

The lens unit 6 includes a sector-shaped base 10 having a central portion at which a pivot 10a is provided and a peripheral portion 10b the vicinity of which is slidably supported by a circular rail 18. With this construction, the base 10 is rotatable in a plane parallel to the original table 2. The lens unit 6 further includes three lenses 11 to 13 which have different magnifying factors and are arranged on the base 10 so that the centers of their optical axes coincide with each other upon change-over, and a driving unit 14 composed of a pair of pulleys 16, a motor 17 and a wire 15 which is engaged with the peripheral portion 10b for wire-driving the base 10 right and left in the above-mentioned plane. By controlling the motor 17 in accordance with a procedure which will be mentioned later on, each of the lenses 11 to 13 is selectively arranged between the mirror 5b of the mirror unit 5 and the image receiving element 7. If the driving unit 14 is provided on the pivot 10a side opposite to the peripheral portion 10b and the wire 15 is laid over to enclose the base 10, no excess space is not required for the installation of the driving unit and hence there results in a compact construction as a whole.

In FIG. 1, a reference pattern 19 for detecting which one of the lenses 11 to 13 of the lens unit 6 is arranged between the mirror 5b and the image receiving element 7 and whether or not its optical axis coincides with the optical path, is downward provided at a waiting position of the scanning unit 3 or at a proper position other than a scanning range of the original table 2. The reference pattern 19 includes two white stripes depicted with a predetermined interval on a black ground. Accordingly, which one of the lenses 11 to 13 is arranged between the mirror 5b and the image receiving element 7 can be checked by reading the reference pattern 19 received by the image receiving element 7 when the scanning unit 3 is at the waiting position and measuring the positions of the two white stripes and an interval therebetween to check whether or not they coincide with conditions beforehand given. Also, whether or not the optical axis of the arranged lens coincides with the optical path can be checked by measuring a deviation in position of the white stripe. The check can be made without using a limit switch, a proximity sensor or the like. It is needless to say that the actual reference pattern may comprise a pattern including only one stripe, a pattern including a black stripe depicted on a white ground, and so forth, as shown in FIGS. 3(a)–3(h) by way of example. The result of check thus obtained is based on the final output of a detecting optical system. Therefore, the result of check involves all errors included on the way.

When it is determined on the basis of the result of check that a proper lens is not arranged, the motor 17 is driven to wind up the wire 15 clockwise or counterclockwise so that a desired one of the lenses 11 to 13 is selectively arranged between the mirror 5b of the mirror unit 5 and the image receiving element 7 and the fine positioning of the lens is made. In this case, with the structure in which the sector-shaped base 10 is rotated around the pivot 10a, no deviation in a radial direction is generated and a positional deviation in a rotational direction can be cancelled through a feedback control. Therefore, a high precision can be obtained easily as compared with a structure in which a linear sliding is made.

The image receiving element 7 is provided at a proper position on the lower stream of the optical path than the mirror 5b and may be placed at the position of the pivot 10a.

Figure 4:
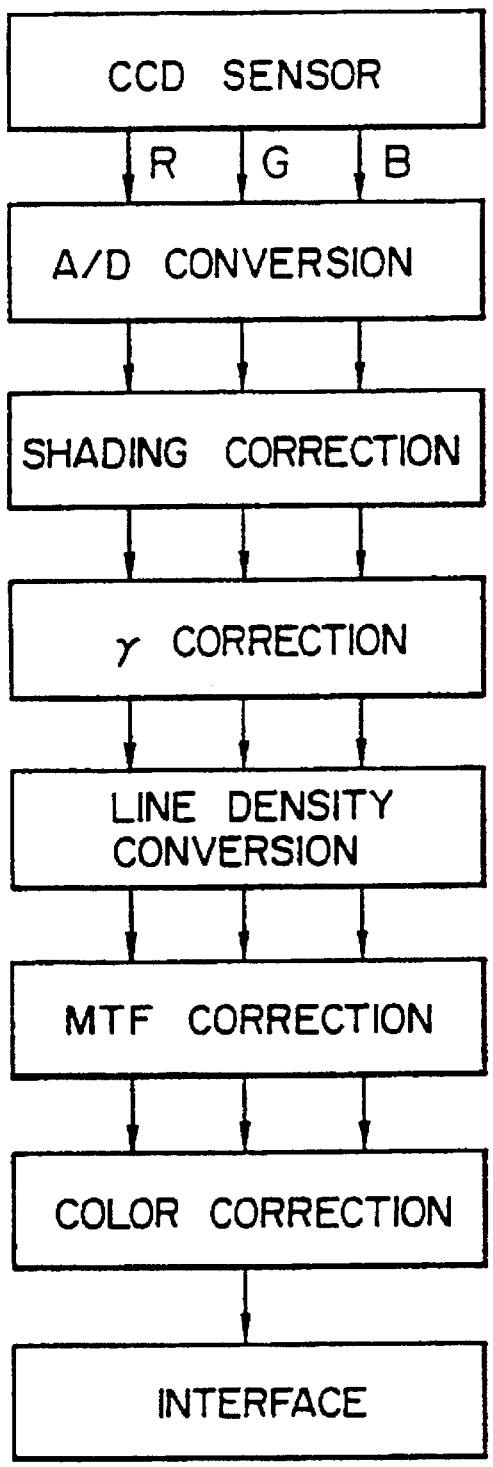
FIG. 4 is a block diagram showing the gist of the operation of the image scanner of the present embodiment.

FIG. 4 is a block diagram showing the simplified processing procedure of the present image scanner. First, an image is received by the CCD image receiving element 7 from the original table 2 through the scanning unit 3, the mirror unit 5 and the lens unit 6. R, G and B signals corresponding to the received image are outputted from the CCD element 7 to the image processor unit 8. The image processor unit 8 converts the received analog R, G and B signals into digital signals, respectively. With this A/D conversion, the subsequent signal processing can be performed by a digital operation. The image processor unit 8 performs a shading processing and a gradation conversion (or γ correction) for the digital R, G and B signals and may further perform a line density conversion, as required.

Though the number of bits of the A/D conversion determines the scale of the digital operation, the number of bits in the present embodiment is large as 12 bits for each channel. Therefore, a shading correction method based on a LUT (look-up table) system used in the conventional image scanner is not preferable since a required memory capacity is extremely increased. Also, it is difficult to improve the precision of the line density conversion.

The image processor unit 8 further performs an MTF (modulation transfer function) correction and a color correction for the image signal subjected to the above-mentioned processing and thereafter outputs it to the exterior through an interface. The signal is subjected to an image processing by a computer or the like (not shown) and is then outputted to an output device such as a plotter.

Each lens is selected in accordance with a line density required by the processor side. In the present embodiment, the base 10 is rotated by the wire 15. Means for rotating the base 10 in a plane may include, for example, a method using a gear or toothed wheel, a method using a direct coupling to a motor shaft, and so forth.

In the present embodiment, there is used a construction in which the table having an object placed thereon is stationary whereas the scanning means and the reflecting optical system including mirrors therein are moved. However, there may be used a construction in which the scanning means and the reflecting optical system are stationary whereas the table is moved.

INDUSTRIAL APPLICABILITY

As apparent from the foregoing explanation, in an image scanner according to the present invention, since each lens is supported on a rotatable base with a pivot, the high precision of positioning is ensured upon change-over of a plurality of lenses if only the pivot is mounted with a high precision. Also, since the direction of rotation of the base is along the surface of an original table, the size in a height direction is substantially the same as that in the case of a single lens and the size of the whole of a device is not increased.

In a lens control structure and control method according to the present invention, since the kind and/or position of a lens used is detected from the image of a reference pattern which is actually received, a lens position detecting sensor or the like is not required. Namely, the number of parts is reduced and a process upon assembly is simplified, thereby improving the assembling work. Further, it is possible to accurately and easily perform a lens position control.

Figure 5:
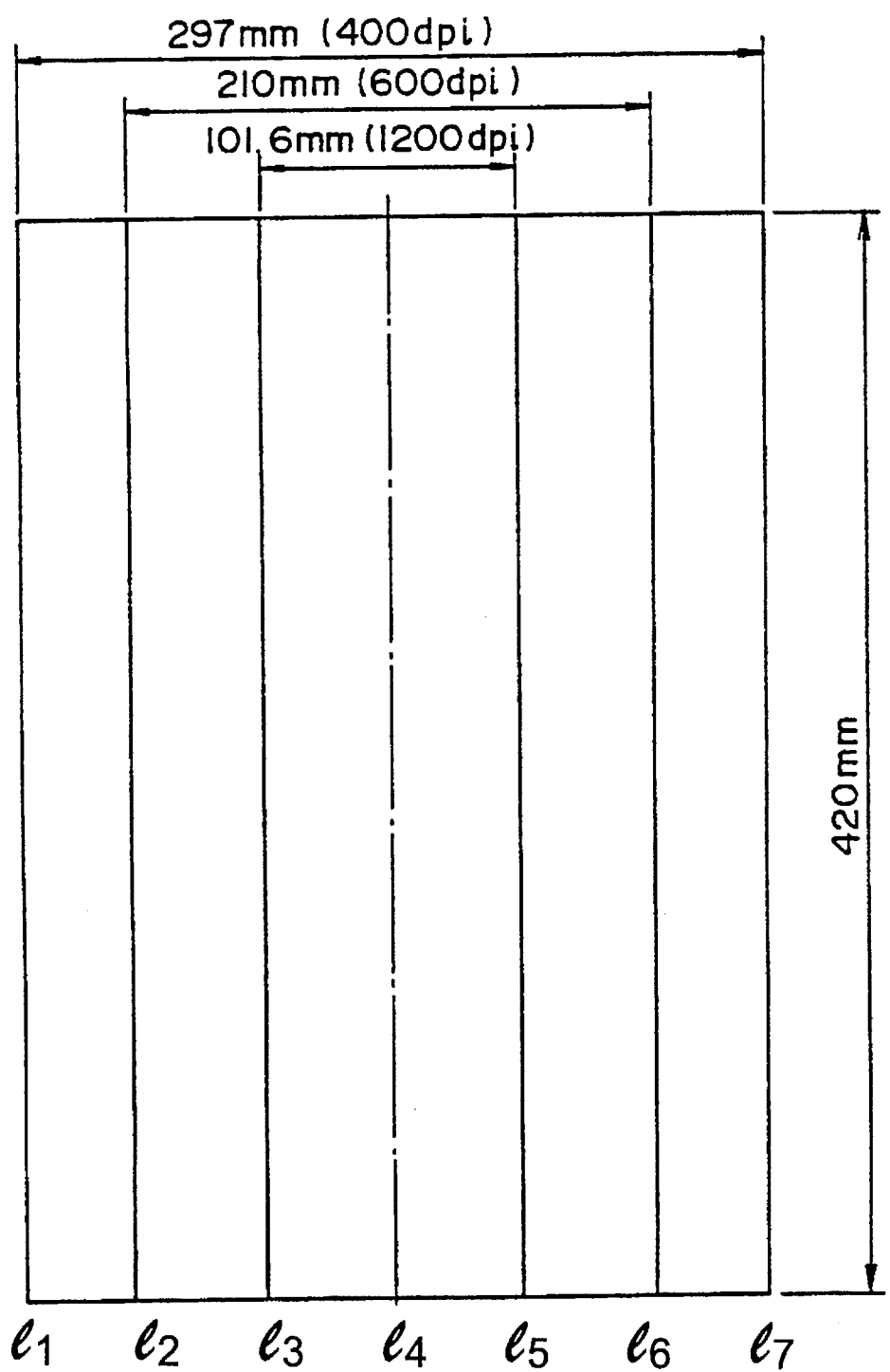
FIG. 5 is a diagram representing a relationship between the size of an original and a desired resolving power.

In a scanner to which the present invention is applied, optical lenses are automatically or manually changed over in accordance with the size of an original so that the resolving power can be changed with no deterioration of an image. FIG. 5 is a diagram showing a relationship between the resolving power and the original.

For example, it is preferable that the image of an A3-size original having a longitudinal dimension of 297 mm and falling between lines $l_1$ and $l_7$ should be read with a resolving power of 400 dpi. Also, it is preferable that the image of an A4-size original having a longitudinal dimension of 210 mm and falling between lines $l_2$ and $l_6$ should be read with a resolving power of 600 dpi. Further, it is preferable that the image of a so-called 4×5 inch size original having a longitudinal and lateral dimensions of 101.6 mm and 127 mm and falling between lines $l_3$ and $l_5$ or within 101.6 mm should be read with a resolving power of 1200 dpi.

If a user places an original of $l_3$ and $l_5$ size on the original table surface of the scanner, the scanner determines from the size of the original that the resolving power of 1200 pdi is suitable. Thereby, a change-over to a lens for 1200 dpi is made and the original is automatically read with 1200 dpi.

In the case where a certain portion of an A4-size original includes a photograph or the like and it is desired that only the corresponding portion should be read with the resolving power of 1200 dpi, the setting may be made in such a manner that the corresponding portion is placed on the $l_3$–$l_5$ area and 1200 dpi is selected through a manual operation. Thereby, even in the case of an original with a size other than a defined size, an image can be read with 1200 dpi.

The lens may be determined by an operator's selection.

I claim:

1. A lens position control structure in an image scanner in which a plurality of lenses can be used in a change-over manner, the image scanner taking in the image of an object by an image receiving element, the structure comprising a reference pattern provided at a predetermined position at which it is readable through the changed-over lens, and means for detecting the kind of the changed-over lens from image data of said reference pattern read by said image receiving element.

2. A lens position control structure in an image scanner according to claim 1, further comprising means for detecting the deviation of said lens from the image data of said reference pattern read by said image receiving element.

3. A lens position control method in an image scanner in which a plurality of lenses can be used in a change-over manner, the image scanner taking in the image of an object by an image receiving element, the method comprising the steps of:

reading image data of a reference pattern provided at a predetermined position at which it is readable through the changed-over lens; and detecting a kind of the changed-over lens from said image data.

4. A lens position control method in an image scanner according to claim 3, further comprising a step of detecting deviation of said lens from the image data of said reference pattern read by said image receiving element.

\* \* \* \* \*

UNITED STATES PATENT AND TRADEMARK OFFICE
CERTIFICATE OF CORRECTION

PATENT NO. : 5,610,755
DATED : March 11, 1997
INVENTOR(S) : Tadao Ohtsuka

It is certified that error appears in the above-identified patent and that said Letters Patent is hereby corrected as shown below:

On the title page item,

[73] Assignee: delete "Nippon Steel Corporation, Tokyo, Japan" and insert -- Microtek International, Inc., Hsinchu, Taiwan --.

Signed and Sealed this

Third Day of February, 1998

*Attest:*

BRUCE LEHMAN

*Attesting Officer*     *Commissioner of Patents and Trademarks*